US010655663B2

(12) United States Patent
Jacobs et al.

(10) Patent No.: US 10,655,663 B2
(45) Date of Patent: May 19, 2020

(54) APPARATUS, SYSTEM, AND METHOD FOR ALIGNING APERTURES OF STRUCTURES

(71) Applicant: LOCKHEED MARTIN CORPORATION, Bethesda, MD (US)

(72) Inventors: Harry Robert Jacobs, Fort Worth, TX (US); Brian Beavers, Fort Worth, TX (US); Derek Michael Newman, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 249 days.

(21) Appl. No.: 15/720,481

(22) Filed: Sep. 29, 2017

(65) Prior Publication Data
US 2019/0101146 A1 Apr. 4, 2019

(51) Int. Cl.
| B64C 1/12 | (2006.01) |
| F16B 13/08 | (2006.01) |
| F16B 19/00 | (2006.01) |
| F16B 19/02 | (2006.01) |
| F16B 5/02 | (2006.01) |
| F16B 5/08 | (2006.01) |

(52) U.S. Cl.
CPC ............ *F16B 13/0825* (2013.01); *B64C 1/12* (2013.01); *F16B 19/00* (2013.01); *F16B 19/02* (2013.01); *F16B 5/02* (2013.01); *F16B 5/08* (2013.01)

(58) Field of Classification Search
CPC .......... B64C 1/12; F16B 5/08; F16B 13/0825; F16B 19/00; F16B 19/02
USPC ........................................................ 244/132
See application file for complete search history.

(56) References Cited

U.S. PATENT DOCUMENTS

| 3,072,423 A | * | 1/1963 | Charlton | F16B 5/02 |
| | | | | 403/83 |
| 3,081,494 A | * | 3/1963 | Darnell | B29C 45/2606 |
| | | | | 249/160 |
| 3,112,547 A | | 12/1963 | Poe | |
| 3,116,528 A | | 1/1964 | Poe | |
| 3,596,948 A | | 8/1971 | Spoehr | |
| 3,630,253 A | | 12/1971 | Sherman | |
| 4,114,509 A | | 9/1978 | Poe | |
| 4,815,907 A | | 3/1989 | Williamson | |
| 4,964,594 A | * | 10/1990 | Webb | B64C 1/12 |
| | | | | 244/129.3 |
| 5,059,059 A | | 10/1991 | Cox | |
| 5,244,326 A | | 9/1993 | Henriksen | |
| 5,314,281 A | | 5/1994 | Turlach et al. | |
| 6,889,939 B2 | * | 5/2005 | Rouyre | B64C 7/00 |
| | | | | 244/131 |

(Continued)

FOREIGN PATENT DOCUMENTS

GB        2093551 A        9/1982

*Primary Examiner* — Claude J Brown
(74) *Attorney, Agent, or Firm* — Baker Botts L.L.P.

(57) ABSTRACT

In an embodiment, a system includes a first structure comprising a first aperture and a second structure comprising a second aperture. The system also includes a first pin configured to be inserted into the first aperture of the first structure and a retaining device configured to be coupled to the first pin. The system further includes a second pin configured to be inserted into the second aperture of the second structure and coupled to the first pin. The first pin includes a first shoulder and a second shoulder, the first shoulder having a different diameter than the second shoulder.

20 Claims, 3 Drawing Sheets

(56) References Cited

U.S. PATENT DOCUMENTS

| | | | |
|---|---|---|---|
| 8,070,100 B2* | 12/2011 | Douglas | ................ B64C 3/185 |
| | | | 244/123.1 |
| 2008/0170928 A1 | 7/2008 | Stadler et al. | |
| 2011/0008125 A1* | 1/2011 | Moon | ...................... F16B 5/02 |
| | | | 411/108 |
| 2011/0170982 A1 | 7/2011 | Watanabe | |
| 2012/0055008 A1 | 3/2012 | Boulet et al. | |
| 2015/0016918 A1 | 1/2015 | Colombo | |
| 2016/0319854 A1* | 11/2016 | Mongeau | ................ F16B 5/02 |
| 2016/0347439 A1 | 12/2016 | Christensen et al. | |

* cited by examiner

APPARATUS, SYSTEM, AND METHOD FOR ALIGNING APERTURES OF STRUCTURES

GOVERNMENT INTEREST

This invention was made with government support under contract number N00019-14-C-0002 awarded by the Department of the Navy. The government may have certain rights in the invention.

TECHNICAL FIELD

The present disclosure relates in general to alignment components, and more particularly to an apparatus, system, and method for aligning apertures of structures.

BACKGROUND

Some structures, such as an aircraft skin, may have holes that need to be aligned with holes of another structure so that the structures can be fastened together. These holes are often difficult to coaxially align, particularly when the holes have different diameters.

SUMMARY

In an embodiment, a system includes a first structure comprising a first aperture and a second structure comprising a second aperture. The system also includes a first pin configured to be inserted into the first aperture of the first structure and a retaining device configured to be coupled to the first pin. The system further includes a second pin configured to be inserted into the second aperture of the second structure and coupled to the first pin. The first pin includes a first shoulder and a second shoulder, the first shoulder having a different diameter than the second shoulder.

Technical advantages of certain embodiments may include ensuring coaxial alignment of different-sized apertures. By coaxially aligning apertures, structures may be properly within design requirements. Another advantage may include increasing manufacturing efficiency and cost savings from faster component installations due to the system's ability to quickly align different-sized apertures. Cost savings may also result from the ability to reuse the first and second pin. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Multiple structures may need to be fastened together. For example, an airplane, boat, car, or other vehicle may have a skin and a substructure that need to be fastened together. These structures may have different-sized holes to facilitate fastening one structure to another, such as by inserting a fastener through a hole in each of the structures. However, given that the holes may have different diameters, the corresponding holes in each structure may not necessarily line up with design requirements every time. Manually attempting to align the holes of the structures without using a part that coaxially aligns the different-sized holes may decrease manufacturing efficiency and increase costs. Failure to align a hole may also lead to a system that does not meet design requirements.

To overcome these and other problems, a first pin that includes a first shoulder and a second shoulder may be used to coaxially align two different-sized apertures of two structures. The first pin's shoulders may each have a different diameter so that the first shoulder with a first diameter forms a slip fit with the first aperture and the second shoulder with a second diameter forms a slip fit with the second aperture. As a result, the first pin may provide an efficient and repeatable way to coaxially align two different-sized apertures of two structures.

Accordingly, aspects of the present disclosure include a system that, in one embodiment, includes a first structure comprising a first aperture and a second structure comprising a second aperture. The system also includes a first pin configured to be inserted into the first aperture of the first structure and a retaining device configured to be coupled to the first pin. The system further includes a second pin configured to be inserted into the second aperture of the second structure and coupled to the first pin. The first pin includes a first shoulder and a second shoulder, the first shoulder having a different diameter than the second shoulder.

Embodiments of the present disclosure may provide numerous advantages. A technical advantage of certain embodiments may include ensuring coaxial alignment of different-sized apertures. By coaxially aligning apertures, structures may be properly within design requirements. Another advantage may include increasing manufacturing efficiency and cost savings from faster component installations due to the system's ability to quickly align different-sized apertures. Cost savings may also result from the ability to reuse the first and second pin. Other technical advantages will be readily apparent to one skilled in the art from the following figures, descriptions, and claims. Moreover, while specific advantages have been enumerated above, various embodiments may include all, some, or none of the enumerated advantages.

Figure 1:
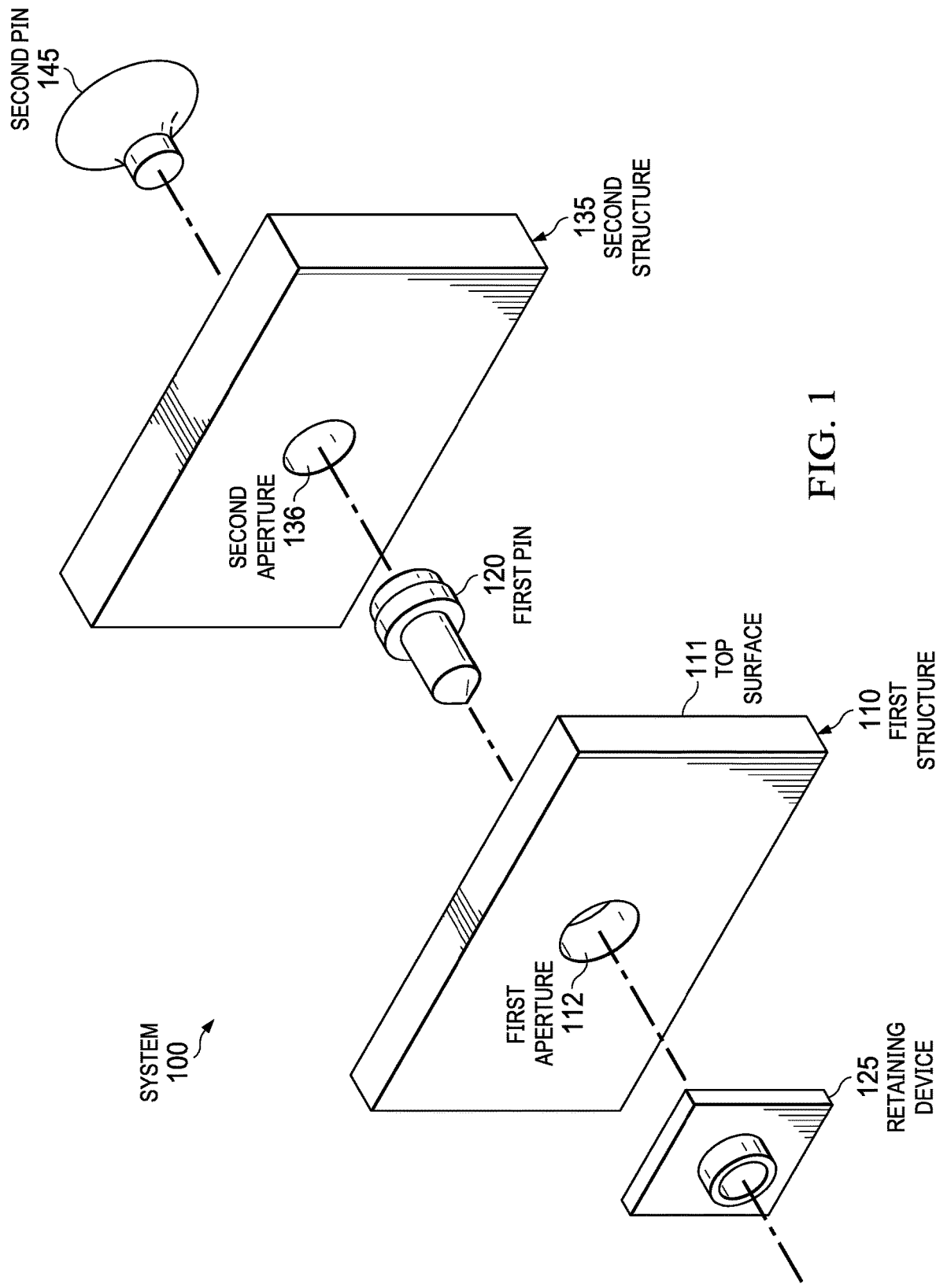
FIG. 1 is an exploded view of an example system, according to certain embodiments of the present disclosure.
Figure 2:
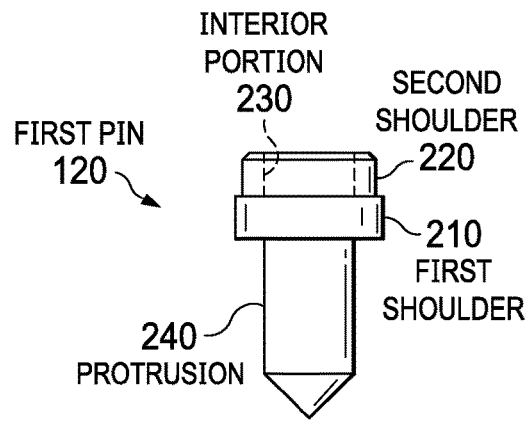
FIG. 2 is a diagram of an example first pin that may be used in the system of FIG. 1, according to certain embodiments of the present disclosure.
Figure 3A:
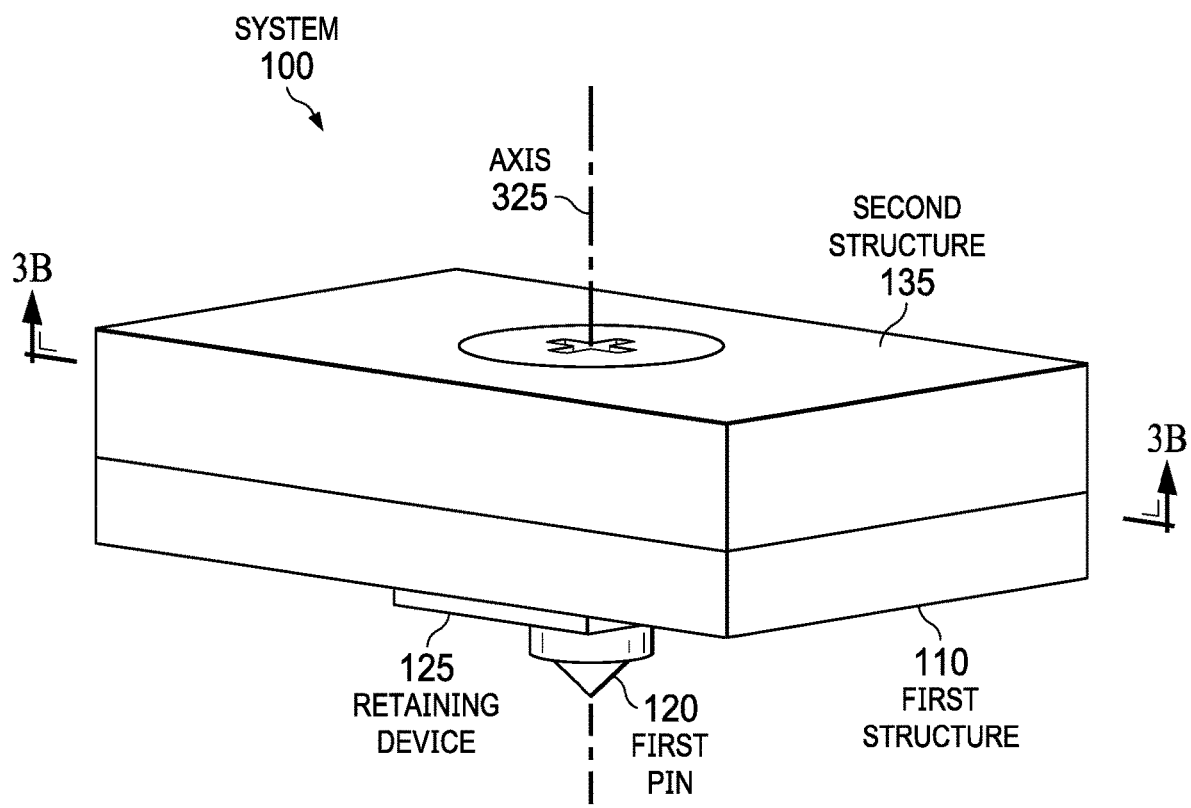
FIG. 3A is a perspective view of the example system of FIG. 1, according to certain embodiments of the present disclosure.
Figure 3B:
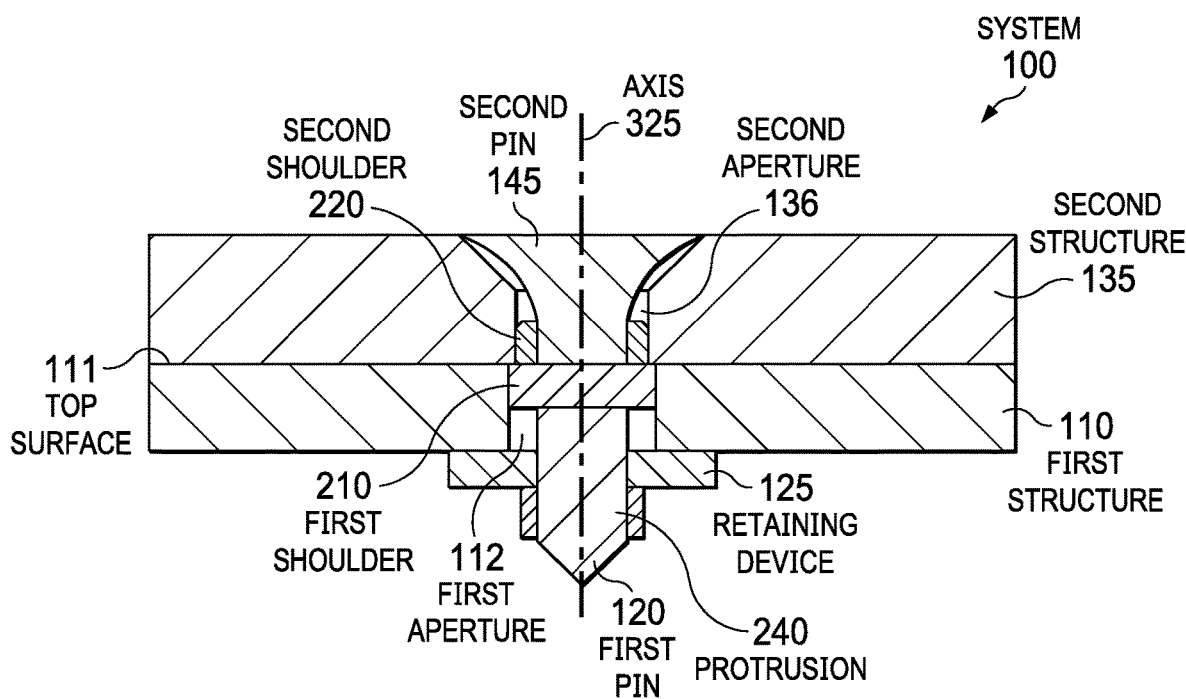
FIG. 3B is a section view taken along section 3B-3B of the system of FIG. 3A, according to certain embodiments of the present disclosure.
Figure 4:
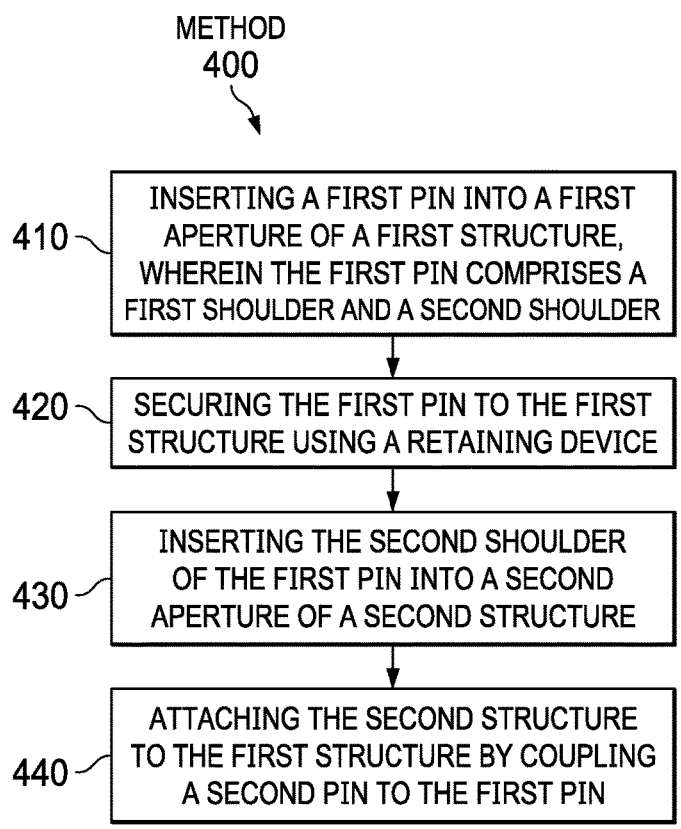
FIG. 4 is a flow chart illustrating an example method of aligning apertures using the system of FIG. 1, according to certain embodiments of the present disclosure.

Additional details are discussed in reference to FIGS. 1 through 4. FIG. 1 illustrates an example system 100 in which an example first pin 120 may be used. FIG. 2 shows a diagram of an example first pin 120. FIGS. 3A and 3B respectively show an assembled view of the example system 100 of FIG. 1 and a section view of the system 100 taken along section 3B-3B. FIG. 4 shows an example method of aligning apertures of system 100.

FIG. 1 is an exploded view of an example system 100, according to certain embodiments of the present disclosure. System 100 may be used to coaxially align different-sized apertures of structures. For example, an aircraft may have a skin that needs to be secured to a sub-structure. Those structures may each have a different-sized aperture through which a component needs to be inserted to secure the skin to the sub-structure. Aligning the apertures, however, is often difficult to do. In an embodiment, system 100 reduces that difficulty by using a pin that includes multiple shoulders each having a different diameter. These shoulders may provide a slip fit to a respective one of the different-sized apertures of the structures, thereby coaxially aligning the apertures of the structures. In an embodiment, system 100 may include a first structure 110, a top surface 111, a first aperture 112, a first pin 120, a retaining device 125, a second structure 135, a second aperture 136, and a second pin 145.

First structure 110 may be any structure including at least one aperture and configured to couple to second structure 135 in an embodiment. For example, first structure 110 may be a sub-structure that attaches to another structure. As another example, first structure 110 may be the main structural component of an aircraft to which the aircraft's outer skin attaches. As yet another example, first structure 110 may be the main structural component of a car. First structure 110 may be made of any material. For example, first structure 110 may be a metal, a plastic, a composite, or any other material. First structure 110 may be any size in an embodiment. First structure 110 may be any shape in an embodiment. First structure 110 may have a plurality of apertures in an embodiment. For example, in an embodiment where first structure 110 is the main structural component of an aircraft, first structure 110 may have multiple apertures for securing first structure 110 to second structure 135. First structure 110 may have top surface 111 and first aperture 112 in an embodiment.

Top surface 111 may be a surface of first structure 110 that is closest or adjacent to second structure 135 in an embodiment. Top surface 111 may be in contact with second structure 135. Top surface 111 may be a surface of first structure 110 opposed to a surface adjacent to retaining device 125. Top surface 111 may be a surface of first structure 110 past which first shoulder 210 of first pin 120 does not extend. Top surface 111 may be any shape in an embodiment. For example, top surface 111 may form a flat or curved surface. First aperture 112 may form a hole in top surface 111 in an embodiment. Top surface 111 may have a plurality of apertures in an embodiment.

First aperture 112 may be a hole through first structure 110 in an embodiment. First aperture 112 may be any size. First aperture 112 may be configured to receive a portion of first pin 120 in an embodiment. For example, first aperture 112 may be sized such that first shoulder 210 of first pin 120 forms a slip fit with first aperture 112. Protrusion 240 of first pin 120 may also extend through all or a portion of first aperture 112 in an embodiment. First aperture 112 may be countersunk in an embodiment. First aperture 112 may be a different size than second aperture 136. For example, first aperture 112 may have a different diameter than second aperture 136. First aperture 112 may be any shape. First aperture 112 may be efficiently and properly aligned with second aperture 136 using first pin 120.

First pin 120 may be any component configured to align second aperture 136 and first aperture 112 using two different sized shoulders in an embodiment. First pin 120 is discussed in detail with respect to FIG. 2 below. Generally, one end of first pin 120 may be secured to a portion of second pin 145 in an embodiment. For example, a portion of first pin 120 may be inserted into second aperture 136 and coupled to second pin 145. An opposite end of first pin 120 may be secured to retaining device 125 in an embodiment. For example, a portion of first pin 120 may be inserted into first aperture 112 and coupled to retaining device 125.

Retaining device 125 may be any device configured to secure first pin 120 to first structure 110. For example, retaining device 125 may include at least one of a nut plate, a threaded fastener, a fastener, a hex nut, an e-clip, glue or a weld. Retaining device 125 may be any shape or size.

Second structure 135 may be any structure including at least one aperture and configured to couple to first structure 110 in an embodiment. For example, second structure 135 may be an outer structure of a component that attaches to a sub-structure. As another example, second structure 135 may be an aircraft skin. As yet another example, second structure 135 may be outer structure of a car. Second structure 135 may be made of any material. For example, second structure 135 may be a metal, a plastic, a composite, or any other material. Second structure 135 may be any size in an embodiment. Second structure 135 may be any shape in an embodiment. Second structure 135 may have a plurality of apertures in an embodiment. For example, in an embodiment where second structure 135 is an aircraft skin, second structure 135 may have multiple apertures for securing second structure 135 to first structure 110.

Second aperture 136 may be a hole through second structure 135 in an embodiment. Second aperture 136 may be any size. Second aperture 136 may be configured to receive a portion of first pin 120 in an embodiment. For example, second aperture 136 may be sized such that second shoulder 220 of first pin 120 forms a slip fit with second aperture 136. Second aperture 136 may also be configured to receive a portion of second pin 145. Second aperture 136 may be countersunk in an embodiment. Second aperture 136 may have a different size that first aperture 112. For example, second aperture 136 may have a different diameter than first aperture 112. Second aperture 136 may be any shape. As explained below, second aperture 136 may be efficiently and properly aligned with first aperture 112 using first pin 120.

FIG. 2 is a diagram of an example first pin 120 that may be used in system 100 of FIG. 1, according to certain embodiments of the present disclosure. Generally, first pin 120 may align first aperture 112 and second aperture 136 using two different sized shoulders. First pin 120 may include a first shoulder 210, a second shoulder 220, an interior portion 230, and a protrusion 240.

First shoulder 210 may be a portion of first pin 120 configured to provide a slip fit with first aperture 112 of first structure 110 thereby creating a coaxial condition (i.e., a datum) between first aperture 112 and second aperture 136. First shoulder 210 may have a diameter that is different than a diameter of second shoulder 220 in an embodiment. For example, first shoulder 210 may have a diameter that is greater than a diameter of second shoulder 220. First shoulder 210 may be a solid portion of first pin 120. First shoulder 210 may not extend above top surface 111 of first structure 110 in an embodiment. First shoulder 210 may not extend into any portion of second aperture 136 in an embodiment. First shoulder 210 may be positioned between second shoulder 220 and protrusion 240 in an embodiment. First shoulder 210 may form protrusion 240 in an embodiment. For example, first shoulder 210 may be a continuous-diameter portion of first pin 120 extending away from second shoulder 220 in an axial direction. In other embodiments, first shoulder 210 may have a different diameter than protrusion 240. First shoulder 210 may be any shape in an embodiment. For example, first shoulder 210 may be circular, cylindrical, rectangular, square, or any other shape.

Second shoulder 220 may be a portion of first pin 120 configured to provide a slip fit with second aperture 136 in an embodiment. Second shoulder 220 may have a diameter than is different than a diameter of first shoulder 210 in an embodiment. For example, second shoulder 220 may have a diameter that is smaller than a diameter of first shoulder 210 in an embodiment. Second shoulder 220 may extend in an axial direction away from first shoulder 210 in an embodiment. Second shoulder 220 may be positioned on one end of first shoulder 210 opposite to protrusion 240 in an embodiment. Second shoulder 220 may be inserted into second aperture 135, but may not extend into any portion of first aperture 112 in an embodiment. Second shoulder 220 may have interior portion 230 to couple with second pin 145 in an embodiment. Second shoulder 220 may be any shape in an embodiment. For example, second shoulder 220 may be circular, cylindrical, rectangular, square, or any other shape.

Interior portion 230 may be an interior portion of second shoulder 220 configured to secure to second pin 145 in an embodiment. Interior portion 230 may have threads that mate with threads of second pin 145 in an embodiment. Interior portion 230 may be a smooth surface in other embodiments. Interior portion 230 may be sized so that second pin 145 can be inserted into interior portion 230 in an embodiment.

Protrusion 240 may be any portion of first pin 120 configured to secure to retaining device 125 in an embodiment. For example, protrusion 240 may be a cylindrical portion of first pin 120 extending from a bottom surface of first shoulder 210 that is secured to retaining device 125. Protrusion 240 may have a smaller diameter than first shoulder 210 in an embodiment. Protrusion 240 may have the same diameter as first shoulder 210 in an embodiment. Protrusion 240 may be part of first shoulder 210 in an embodiment. For example, first shoulder 210 may extend axially away from second shoulder 220 such that first shoulder 210 forms protrusion 240 in an embodiment. Protrusion 240 may be coupled to retaining device 125 in any manner in an embodiment. For example, protrusion 240 may have threads that engage with threads of retaining device 125. As another example, protrusion 240 may be a non-threaded surface that can secure to retaining device 125 such as, for example, with glue. Protrusion 240 may have a tapered portion, which may enhance engagement with retaining device 125 in an embodiment.

FIG. 3A is a perspective view of the example system 100 of FIG. 1, according to certain embodiments of the present disclosure. FIG. 3B is a section view taken along section 3B-3B of system 100 of FIG. 3A, according to certain embodiments of the present disclosure. These figures respectively include an assembled view of system 100 and a section view of system 100. In addition to discussing axis 325, an example embodiment of operation of system 100 is discussed below with reference to FIGS. 3A and 3B.

Axis 325 is a reference line through the center of first aperture 112 and second aperture 136 in an embodiment. First pin 120 may facilitate the alignment of first aperture 112 and second aperture 136 such that second aperture 136 and first aperture 112 are coaxial with axis 325 in an embodiment.

As an example embodiment of operation, first pin 120 may be inserted through first aperture 112 such that first shoulder 210 of first pin 120 forms a slip fit with first aperture 112. First shoulder 210 may not extend above top surface 111 of first structure 110, as shown in FIG. 3B, which may prevent a gap from forming between first structure 110 and second structure 135. First shoulder 210 may extend through all or a portion of first aperture 112. First pin 120 may be coupled to retaining device 125 so that first pin 120 may be secured to first structure 110. Second shoulder 220 extends above top surface 111 and into second aperture 136 of second structure 135 as shown in FIG. 3B. Second shoulder 220 may be inserted into second aperture 136 such that second shoulder 220 of first pin 120 forms a slip fit with second aperture 136. Second shoulder 220 may include interior portion 230 so that second pin 145 may be inserted into second shoulder 220 of first pin 120 to secure first structure 110 and second structure 135 as shown in FIG. 3B. First shoulder 210 and second shoulder 220 therefore align first aperture 112 and second aperture 136 with axis 325 in an efficient and repeatable manner. First pin 120 and second pin 145 may be reused thereby saving costs in an embodiment.

FIG. 4 is a flow chart illustrating an example method 400 of aligning apertures using system 100 of FIG. 1, according to certain embodiments of the present disclosure. In an embodiment, method 400 starts at step 410 where first pin 120 may be inserted into first aperture 112 of first structure 110. In an embodiment, first shoulder 210 is inserted into first aperture 112 and forms a slip fit with first aperture 112. First shoulder 210 may be inserted into first aperture 112 such that first shoulder 210 does not extend above top surface 111 of first structure 110. By not extending above top surface 111 of first structure 110, first pin 120 does not create a gap between first structure 110 and second structure 135 in an embodiment.

At step 420, first pin 120 may be secured to first structure 112 using retaining device 125. First pin 120 may be secured to first structure 112 using any type of retaining device 125. For example, first pin 120 may be secured to first structure 112 by screwing a nutplate, a threaded fastener, a hexnut, or a fastener on to first pin 120. As another example, first pin 120 may be secured to first structure 112 by welding first pin 120 to retaining device 125. As another example, first pin 120 may be secured to first structure 112 by gluing first pin 120 to first structure 112 (e.g., by adding glue to first aperture 112).

At step 430, second shoulder 220 of first pin 120 may be inserted into second aperture 136 of second structure 135. In an embodiment, second shoulder 220 of first pin 120 is inserted into second aperture 136 and forms a slip fit with second aperture 136. Second shoulder 220 may be inserted into second aperture 136 such that second shoulder 220 does not extend beyond a top surface of second structure 135.

At step 440, second structure 135 may be attached to first structure 110 by coupling second pin 145 to first pin 120. For example, second pin 145 may be screwed into interior portion 230 of second shoulder 220 of first pin 120.

As an example embodiment of operation, first pin 120 may be inserted into first aperture 112, such as by inserting first shoulder 210 into first aperture 112 to form a slip fit between first shoulder 210 and first aperture 112. First pin 120 may be secured to first structure 110 using retaining device 125, such as by screwing on a threaded fastener at one end of first pin 120. Second shoulder 220 of first pin 120 may be inserted into second aperture 136 of second structure 135, thereby aligning first aperture 112 and second aperture

136 with axis 325. Second structure 135 may be attached to first structure 110 by coupling second pin 145 to first pin 120.

The present disclosure may provide numerous advantages. For example, a technical advantage of certain embodiments may include ensuring coaxial alignment of different-sized apertures. By coaxially aligning apertures, structures may be properly within design requirements. Another advantage may include increasing manufacturing efficiency and cost savings from faster component installations due to the system's ability to quickly align different-sized apertures. Cost savings may also result from the ability to reuse the first and second pin. Other technical advantages will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. An apparatus, comprising:
   a first pin configured to be inserted into a first aperture of a first structure;
   a retaining device configured to secure the first pin to the first structure; and
   a second pin configured to be inserted into a second aperture of a second structure and coupled to the first pin;
   wherein the first pin comprises a first shoulder and a second shoulder, the first shoulder having a different diameter than the second shoulder.

2. The apparatus of Claim 1, wherein the first shoulder does not extend above a top surface of the first structure when the first pin is inserted into the first aperture.

3. The apparatus of claim 1, wherein the second shoulder is configured to extend above a top surface of the first structure.

4. The apparatus of claim 3, wherein the second shoulder is configured to extend into at least a portion of the second aperture of the second structure.

5. The apparatus of Claim 1, wherein the second pin is configured to be coupled to an interior portion of the first pin.

6. The apparatus of claim 1, wherein the first shoulder is configured to have a slip fit with the first aperture of the first structure and the second shoulder is configured to have a slip fit with the second aperture of the second structure.

7. The apparatus of claim 1, wherein the retaining device comprises at least one of:
   a nutplate;
   a threaded fastener;
   a fastener;
   a hex nut;
   an e-clip;
   a glue; or
   a weld.

8. The apparatus of claim 1, wherein a diameter of the first shoulder is larger than a diameter of the second shoulder.

9. The apparatus of claim 1, wherein the first structure comprises a sub-structure of an aircraft and the second structure comprises a skin of the aircraft.

10. A system, comprising:
    a first structure comprising a first aperture;
    a second structure comprising a second aperture;
    a first pin configured to be inserted into the first aperture of the first structure;
    a retaining device configured to secure the first pin to the first structure; and
    a second pin configured to be inserted into the second aperture of the second structure and coupled to the first pin;
    wherein the first pin comprises a first shoulder and a second shoulder, the first shoulder having a different diameter than the second shoulder.

11. The system of claim 10, wherein the first shoulder does not extend above a top surface of the first structure when the first pin is inserted into the first aperture.

12. The system of claim 10, wherein the second shoulder is configured to extend above a top surface of the first structure.

13. The system of claim 12, wherein the second shoulder is configured to extend into at least a portion of the second aperture of the second structure.

14. The system of claim 10, wherein the second pin is configured to be coupled to an interior portion of the first pin.

15. The system of claim 10, wherein the first shoulder is configured to have a slip fit with the first aperture of the first structure and the second shoulder is configured to have a slip fit with the second aperture of the second structure.

16. The system of claim 10, wherein the retaining device comprises at least one of:
    a nutplate;
    a threaded fastener;
    a fastener;
    a hex nut;
    an e-clip;
    a glue; or
    a weld.

17. The system of claim 10, wherein a diameter of the first shoulder is larger than a diameter of the second shoulder.

18. A method, comprising:
    inserting a first pin into a first aperture of a first structure, wherein the first pin comprises a first shoulder and a second shoulder, the first shoulder having a different diameter than the second shoulder;
    securing the first pin to the first structure using a retaining device;
    inserting the second shoulder of the first pin into a second aperture of a second structure; and
    attaching the second structure to the first structure by coupling a second pin to the first pin.

19. The method of claim 18, wherein the first shoulder does not extend above a top surface of the first structure when the first pin is inserted into the first aperture.

20. The method of claim 18, wherein the second shoulder is configured to extend above a top surface of the first structure.

* * * * *